United States Patent
Lee et al.

(10) Patent No.: US 10,465,905 B2
(45) Date of Patent: Nov. 5, 2019

(54) ENERGY SAVING COMBUSTION DEVICE FOR BURNING REFRACTORY HAZARDOUS GAS AND METHOD FOR OPERATING THE SAME

(71) Applicant: KOREA INSTITUTE OF ENERGY RESEARCH, Daejeon (KR)

(72) Inventors: Dae Keun Lee, Daejeon (KR);
Seung-gon Kim, Daejeon (KR);
Dong-soon Noh, Daejeon (KR);
Chang-bog Ko, Daejeon (KR);
Young-tae Guahk, Gyeonggi-do (KR)

(73) Assignee: Korea Institute of Energy Research, Daejeon (KR)

( * ) Notice: Subject to any disclaimer, the term of this patent is extended or adjusted under 35 U.S.C. 154(b) by 344 days.

(21) Appl. No.: 15/035,963

(22) PCT Filed: Mar. 26, 2015

(86) PCT No.: PCT/KR2015/002964
§ 371 (c)(1),
(2) Date: May 11, 2016

(87) PCT Pub. No.: WO2016/153096
PCT Pub. Date: Sep. 29, 2016

(65) Prior Publication Data
US 2017/0102143 A1    Apr. 13, 2017

(51) Int. Cl.
*F23G 7/06* (2006.01)
*F23J 15/04* (2006.01)

(52) U.S. Cl.
CPC ........... *F23G 7/06* (2013.01); *F23G 7/065* (2013.01); *F23J 15/04* (2013.01)

(58) Field of Classification Search
CPC ........................................................... F23G 7/06
(Continued)

(56) References Cited

U.S. PATENT DOCUMENTS 4,236,464 A    12/1980 Anderson et al.
5,174,744 A *  12/1992 Singh ..................... F23D 14/26
                                                          126/91 R
(Continued)

FOREIGN PATENT DOCUMENTS

DE    04042028 A1    7/1992
EP    1297891 A1    4/2003
(Continued)

OTHER PUBLICATIONS

Lee Dae Keun, et al., "Experimental and theoretical study of excess enthalpy flames stabilized in a radial multi-channel as a model cylindrical porous medium burner", Science Direct, Combustion and Flame, vol. 170 (2016), pp. 79-90.
(Continued)

*Primary Examiner* — Avinash Savani
*Assistant Examiner* — Rabeeul Zuberi
(74) *Attorney, Agent, or Firm* — Akerman LLP

(57) ABSTRACT

The present invention relates to a combustion device 100 for burning refractory hazardous gases and a burning method for the combustion device. More particularly, the combustion device 110 for burning refractory hazardous gases, which is provided in a scrubber system 1 for burning waste gases, the combustion device 110 includes: a first porous body 141; a second porous body 142; and an igniter for forming a flame surface 143 at the interior of the combustion device 110, wherein the flame surface 143 formed by the igniter is located between the first porous body 141 and the second porous body 142, and so as to form the flame surface 143, at least one of the first porous body 141 and the second porous body 142 is moved to conduct excess enthalpy combustion.

2 Claims, 6 Drawing Sheets

(58) Field of Classification Search
USPC .................................. 431/5, 7, 75, 326, 197
See application file for complete search history.

(56) References Cited

U.S. PATENT DOCUMENTS

| | | | |
|---|---|---|---|
| 5,464,897 | A | 11/1995 | Das et al. |
| 5,510,093 | A * | 4/1996 | Bartz .................. F23D 14/16 |
| | | | 423/210 |
| 5,649,985 | A | 7/1997 | Imamura |
| 5,711,661 | A * | 1/1998 | Kushch .................. F23D 14/12 |
| | | | 431/326 |
| 5,785,741 | A | 7/1998 | Li et al. |
| 5,935,540 | A | 8/1999 | Otsuka et al. |
| 6,030,591 | A | 2/2000 | Tom et al. |
| 6,059,858 | A | 5/2000 | Lin et al. |
| 6,187,080 | B1 | 2/2001 | Ping-Chung et al. |
| 6,261,524 | B1 | 7/2001 | Herman et al. |
| 6,322,756 | B1 | 11/2001 | Arno et al. |
| 6,468,490 | B1 | 10/2002 | Shamouilian et al. |
| 6,511,641 | B2 | 1/2003 | Herman et al. |
| 6,969,250 | B1 | 11/2005 | Kawamura et al. |
| 7,569,193 | B2 | 8/2009 | Ferron et al. |
| 2003/0194367 | A1 | 10/2003 | Dunwoody et al. |
| 2009/0010816 | A1 | 1/2009 | Ferron et al. |

FOREIGN PATENT DOCUMENTS

| | | |
|---|---|---|
| GB | 2286542 A | 8/1995 |
| GB | 2308991 A | 7/1997 |
| JP | H0530801 U | 4/1993 |
| JP | H11118128 A | 4/1999 |
| JP | 3512528 B2 | 3/2004 |
| JP | 5509483 B2 | 6/2014 |
| KR | 10-0417720 B1 | 4/2004 |
| KR | 20-0405303 Y1 | 1/2006 |
| KR | 200405303 Y1 | 1/2006 |
| KR | 10-2006-0014081 A | 2/2006 |
| KR | 10-0666673 61 | 1/2007 |
| KR | 2007-0061574 A | 6/2007 |
| KR | 10-1417181 B1 | 9/2009 |
| KR | 2009-0099080 A | 9/2009 |
| KR | 10-1029572 B1 | 4/2011 |
| KR | 10-1257263 B1 | 5/2013 |
| KR | 10-1261439 B1 | 5/2013 |
| KR | 10-1270286 B1 | 6/2013 |
| KR | 10-1493786 B1 | 2/2015 |
| KR | 101494623 61 | 2/2015 |
| KR | 10-1511571 B1 | 4/2015 |
| WO | 1993/002772 A1 | 2/1993 |
| WO | 1999/061132 A1 | 2/1999 |
| WO | 2007/144665 A1 | 12/2007 |
| WO | 2016/153096 A1 | 9/2016 |

OTHER PUBLICATIONS

Kim, Seung Gon, et al., "An experimental study of N2 dilution effects on CH4-O2 flame stabilization characteristics in a two-section porous medium", Science Direct, Applied Thermal Engineering, vol. 103 (2016), pp. 1390-1397.

* cited by examiner

ENERGY SAVING COMBUSTION DEVICE FOR BURNING REFRACTORY HAZARDOUS GAS AND METHOD FOR OPERATING THE SAME

This application is a national phase of PCT/KR2015/002964, filed Mar. 26, 2015, the entire contents of which is hereby incorporated by reference.

TECHNICAL FIELD

The present invention relates to a combustion device for burning refractory hazardous gases and a burning method using the combustion device. More particularly, the present invention relates to a combustion device for burning refractory hazardous gases that is provided in a system for burning refractory hazardous gases (a group of perfluorocarbons PFCs, such as $CF_4$, $C_2F_6$, $C_2F_4$ and $SF_6$, and $NF_3$) used and discharged in semiconductor and display manufacturing processes and other various refractory hazardous gases discharged in chemical processes.

BACKGROUND ART

PFCs gases, which are much used in semiconductor and display manufacturing processes, are greenhouse gases causing global warming and have a higher global warming potential by several thousands to tens of thousands of times than $CO_2$. Accordingly, the PFCs gases should be emitted to the air through treatment equipment.

Generally, various kinds of reaction gases used to form a thin film on a wafer or to etch the thin film in the semiconductor manufacturing process have the properties of explosion, extremely high toxicity and suffocating, and accordingly, if they are emitted to the air with no treatment, they are harmful to the human bodies and cause global warming and environmental pollution. Therefore, a scrubber as a gas purification system is provided in the exhaust line of semiconductor equipment to decompose and remove the refractory hazardous gases and to exhaust the purified gases to the air. The refractory hazardous gases are diluted with nitrogen ($N_2$) as an operating fluid of a vacuum pump used to maintain a negative pressure in the process and thus have a density of several hundreds to thousands of ppm or under. After the dilution, the gases are introduced into the scrubber. Hereinafter, the refractory hazardous gases diluted with the inert gas are defined as waste gases.

As known, refractory gases, PFCs are decomposed at a temperature of more than 1600° C., $SF_6$ at a temperature of more than 1200° C., and $NF_3$ at temperature of more than 800° C.

The PFCs, $SF_6$, and $NF_3$ are decomposed to the bonded forms to fluorine and exhausted to the forms of hydrofluoric acid and fluorine, and in this case, they have the properties of extremely high toxicity and explosion, so that they have cleaning reaction with water and are then exhausted.

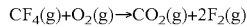

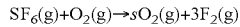

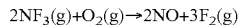

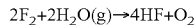

The $F_2$ decomposed through oxidation reaction is reacted generally with water or $H_2O$ as a product after burning and exhausted to the form of HF(g) or HF(l).

The scrubber, which removes semiconductor waste gases generated in the semiconductor manufacturing process, is largely classified into three kinds of scrubbers, that is, an indirect oxidation wet scrubber, a wet scrubber, and a direct burning wet scrubber. Firstly, the indirect oxidation wet scrubber is configured to oxidize waste gases by means of induction heating or electric heater and to treat the particles or soluble gases produced after the oxidation by means of post process using water. Secondly, the indirect oxidation wet scrubber is called a heat-wet scrubber. The wet scrubber is configured to treat the soluble gases contained in waste gases with water and then to exhaust the treated soluble gases. Thirdly, the direct burning wet scrubber is configured to burn waste gases by means of natural gas or propane gas and then to collect soluble gases or particles through water.

As the semiconductor waste gases, further, gases ($SiF_4$, $SiH_4$ and the like) containing silicon and PFCs gases are at the same time introduced in large quantities. In this case, if the heat-wet scrubber or the burn-wet scrubber is adopted, a large quantity of powder is produced in the interior of the scrubber. An example of chemical formula producing powder is as follows.

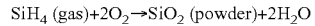

As time passes, by the way, the powder produced after the semiconductor waste gases are burned becomes thickly and more rigidly settled on the inner wall of a burning chamber by means of attractive force and frictional force.

As examples of the waste gas treatments through the scrubber, at present, there are burning, catalytic decomposition, thermal plasma burning, and electrolysis.

Firstly, the burning treatment is conducted by using fossil fuels (for example, LNG) and has some disadvantages of low treatment efficiencies of PFCs, bad flame stability (burning process) and the decrement of products (for example, NOx and CO) after burning.

Secondly, the catalytic decomposition treatment has some problems of catalyst poisoning by high density acid gas (HF, HCL, etc.), increment of operating cost due to short catalyst exchange period, and pressure rise of a system caused by the introduction of particles.

Lastly, the thermal plasma burning and electrolysis treatments make use of electricity as an energy source, and accordingly, they need very high power energy when compared with the capacity treated. The thermal plasma burning treatment causes frequent exchange due to the non-existence of durable torch materials, generates a large quantity of NOx, and needs the bulkiness of incidental equipment (transformer) according to power increment upon high capacity treatment. Further, the electrolysis treatment has a short exchange period due to the durability problem (electric heater etching) of a heating element and is hard to conduct heating at a high temperature of more than 1600° C.

FIG. 1 is a front view showing a conventional waste gas treatment scrubber system. As shown in FIG. 1, the scrubber system 1 for treating semiconductor waste gases includes a plurality of waste gas inlets 112 connected to semiconductor manufacturing process lines, a burner 5 connected to the waste gas inlets 112, a combustion device 110 coupled to the burner 5, a water storage tank 4 coupled to the lower end of the combustion device 110 to collect the powder generated from the combustion device 110 and then to settle the power in water, and a wet tower 3 coupled to the combustion device 110 and the water storage tank 4 to treat fine powder and soluble gases passing through the combustion device 110 with water. In this case, the combustion device 110 and the wet tower 3 may be connected to each other by means of a separate connection pipe, and further, the wet tower 3 has an exhaust pipe formed on the top portion thereof.

According to the conventional scrubber system 1 for treating the semiconductor waste gases, various kinds of waste gases are supplied from the semiconductor manufacturing process lines through the waste gas inlets 112. The waste gases supplied through the waste gas inlets 112 are supplied to the combustion device 110 through the burner 5. The waste gases supplied to the interior of the combustion device 110 are burned by means of the burner 5, and through the combustion, large quantities of hydrofluoric acids, fluorine, and powder are produced. Relatively heavy powder of the produced powder drops by gravity, and then, the powder is settled in the water of the water storage tank 4. On the other hand, relatively light fine powder, which does not drop to the water storage tank 4, is moved to the wet tower 3 through the connection pipe connected between the combustion device 110 and the wet tower 3. The fine powder moved to the wet tower 3 is collected again by means of water, and the collected fine powder drops again to the water storage tank 4 so that it is settled in the water. Of course, the waste gases purified through the wet tower 3 are exhausted to the air through the exhaust pipe.

So as to burn the waste gases, like this, the waste gases should be oxidized at a high temperature more than 1,600° C. ($CF_4$), and as mentioned above, waste gases, that is, refractory hazardous gases are diluted with inert gas (generally, $N_2$) of more than 99% and injected and burned into the scrubber system 1. In this case, however, even the inert gas whose treatment is unnecessary should be heated, thus undesirably making the treatment efficiencies and energy efficiencies substantially lowered.

According to the conventional practice, as shown in FIG. 1, fuel and oxidizer (oxygen) are supplied to the combustion device 110 from fuel inlets 111 and oxidizer inlets 113 through nozzles attached to the combustion device 110 inside the scrubber system 1. Next, the fuel and oxidizer are ignited to form nozzle-attached flames, and the waste gases are injected into the combustion device 110 through the separated waste gas inlets 112.

FIG. 2 is a schematic view showing waste gases and flames generating swirl flows in the conventional practice. Further, FIG. 3 is a schematic view showing flames injected in a cross-flow way with respect to the flows of waste gases in the conventional practice, and FIG. 4 is a photograph showing the flames of FIG. 3.

The waste gases injected into the combustion device 110 are heated and oxidized, while flowing in parallel with the flames or slantly against flames. If the longitudinal directions of the flames determined by the injection angles of the fuel and oxidizer nozzles are parallel with the flow directions of the waste gases, as shown in FIG. 2, the mixing between the high temperature flames and the waste gases becomes slow, and so as to facilitate the mixing, accordingly, swirls are generated (mixing enhancement way). Otherwise, as shown in FIGS. 3 and 4, the injection directions of the fuel and oxidizer nozzles cross the flow directions of the waste gases (cross-flow way) so that the waste gases can hit the high temperature flames and go out of the flames.

Even if the swirls are sufficiently generated in FIG. 2, however, it is difficult that the combustion gases and the waste gases are sufficiently mixed with each other in the combustion device 110 whose size is restricted. Generally, flow rates of waste gases are higher than that of combustion gases, so that large momentums of the waste gases make the flames unstable or even extinguished, thus undesirably decreasing the treatment efficiencies. So as to form the stable flames and enhance the treatment efficiencies, at this time, there is a need to additionally use the fuel and oxidizer. In this case, however, energy efficiencies become low.

Further, as shown in FIGS. 3 and 4, the flames 2 having the shapes of inverted slant cones become not closed on the slant surfaces thereof, but become open by means of the momentums of the waste gases, so that the waste gases escaped from the high temperature flames, thus undesirably decreasing the decomposition efficiencies.

PRIOR ART DOCUMENTS (Patent Document 0001) Korean Patent No. 0750406
(Patent Document 0002) Korean Patent No. 0623368
(Patent Document 0003) Korean Patent Application Laid-open No. 2013-0086925
(Patent Document 0004) Korean Patent Application Laid-open No. 2005-0044309
(Patent Document 0005) Korean Patent Application Laid-open No. 2005-0113159

DISCLOSURE

Technical Problem

Accordingly, the present invention has been made in view of the above-mentioned problems occurring in the prior art, and it is an object of the present invention to provide a combustion device for burning refractory hazardous gases and a burning method using the combustion device that is capable of achieving high treatment efficiencies and high energy efficiencies and allowing waste gases to sufficiently reach a high temperature at which the waste gases are decomposed.

It is another object of the present invention to provide a combustion device for burning refractory hazardous gases and a burning method using the combustion device that is capable of performing combustion in the interiors of porous bodies, without having any additional device like a heat exchanger, so as to increase energy efficiencies and to form high temperature flames, so that heat recirculation can occur through the heat transfer of the conduction and radiation of the porous bodies, and further, the excess enthalpy combustion can be easily conducted at a high temperature.

It is still another object of the present invention to provide a combustion device for burning refractory hazardous gases and a burning method using the combustion device that is capable of mixing the waste gases excessively diluted with inert gas (generally, $N_2$) with fuel and oxidizer, supplying the mixed waste gases to the interiors of porous bodies, and burning the waste gases, so that the waste gases can be burned by very high temperature flames, which are not obtained in typical combustion technologies, through the heat recirculation of the porous bodies, thus improving the treatment efficiencies of the waste gases, and that is capable of treating the waste gases only with a relatively small quantity of fuel, thus improving the energy efficiencies.

It is yet another object of the present invention to provide a combustion device for burning refractory hazardous gases and a burning method using the combustion device that is capable of moving any one of porous bides so as to effectively form flames in an initial step and to ensure a space for forming a flame surface, thus solving the problems that a long period of time is needed to stabilize the temperatures of flames and energy efficiencies are decreased when a flame surface is formed in the interiors of the porous bodies, and that is capable of ensuring sufficient air for forming the flame surface, thus effectively forming the flame surface within a short period of time.

It is yet still another object of the present invention to provide a combustion device for burning refractory hazardous gases and a burning method using the combustion device that is capable of moving any one of porous bides so as to constantly maintain the temperature of a flame surface if the temperature of the flame surface is decreased to reduce the efficiency of the combustion device, while the combustion device is being driven, thus increasing the space of the flame surface to ensure sufficient air for forming the flame surface and constantly maintaining the temperature of the flame surface to increase the efficiency of the combustion device.

Objects, characteristics and advantages of the present invention will be more clearly understood from the detailed description as will be described below and the attached drawings.

Technical Solution

To accomplish the above-mentioned objects, according to a first aspect of the present invention, there is provided a combustion device for burning refractory hazardous gases, which is provided in a scrubber system 1 for burning waste gases, the combustion device including: a first porous body; a second porous body; and an igniter for forming a flame surface at the interior of the combustion device, wherein the flame surface formed by the igniter is located between the first porous body and the second porous body, and so as to form the flame surface, at least one of the first porous body and the second porous body is moved to conduct excess enthalpy combustion.

According to the present invention, desirably, the combustion device further includes fuel inlets, waste gas inlets, and oxidizer inlets formed on one end thereof and an outlet formed on the other end thereof to discharge exhaust gases generated after the waste gases are burned therefrom.

According to the present invention, desirably, one end at which the fuel inlets, the waste gas inlets, and the oxidizer inlets are formed is located on the upper portion of the combustion device, and the other end at which the outlet discharging the exhaust gas is formed is located on the lower portion thereof.

According to the present invention, desirably, the combustion device further includes a premixture for mixing the fuel introduced through the fuel inlets, the waste gases introduced through the waste gas inlets, and the oxidizer introduced through the oxidizer inlets with each other to make a mixed gas.

According to the present invention, desirably, the combustion device further includes a distributor located between the premixture and the first porous body to equally introduce the gas mixed in the premixture into the first porous body.

According to the present invention, desirably, the first porous body and the second porous body are located at the intermediate portion of the combustion device, and the first porous body and the second porous body are brought into contact with the inner peripheral wall of the combustion device so that the mixed gas passes through the first porous body and the second porous body.

According to the present invention, desirably, the mixed gas is brought into sequential contact with the first porous body, the flame surface, and the second porous body, and the pore sizes of the second porous body are greater than the pore sizes of the first porous body.

According to the present invention, desirably, at the ignition step for forming the flame surface, a distance between the first porous body and the second porous body is increased. Further, the combustion device includes means for measuring a temperature of the flame surface at the ignition step. In this case, if the temperature of the flame surface is more than a given temperature, the distance between the first porous body and the second porous body is decreased.

According to the present invention, desirably, the first porous body and the second porous body comprise at least any one selected from a ceramic honeycomb, a ceramic foam, and a ceramic ball bed.

According to the present invention, desirably, the oxidizer introduced through the oxidizer inlets is oxygen or air. Further, the waste gases include the refractory hazardous gases discharged in a semiconductor or display manufacturing process and inert gases for diluting the refractory hazardous gases.

To accomplish the above-mentioned objects, according to a second aspect of the present invention, there is provided a scrubber system having the combustion device.

To accomplish the above-mentioned objects, according to a third aspect of the present invention, there is provided a waste gas treatment method using a combustion device provided in a scrubber system for burning waste gases, the method including the steps of: increasing the distance between a first porous body and a second porous body located at the intermediate portion of the combustion device so as to drive the combustion device; forming a flame surface by means of an igniter located between the first porous body and the second porous body; measuring a temperature of the flame surface; and if the temperature of the flame surface is more than a given temperature, decreasing the distance between the first porous body and the second porous body, thus producing excess enthalpy flames.

According to the present invention, desirably, the waste gas treatment method further includes the step of introducing fuel, waste gases, oxidizer through fuel inlets, waste gas inlets, and oxidizer inlets formed on one end of the combustion device into the combustion device.

According to the present invention, desirably, the waste gas treatment method further includes the step of introducing the fuel, waste gases, and oxidizer into a premixture to make a mixed gas, and after the mixing step, the step of passing the mixed gas through a distributor located between the premixture and the first porous body to allow the mixed gas to be introduced equally into the first porous body.

According to the present invention, desirably, the introduced fuel, waste gases, and oxidizer are brought into sequential contact with the first porous body, the flame surface, and the second porous body.

According to the present invention, desirably, if the temperature of the flame surface is decreased during the introduced fuel, waste gases, and oxidizer pass through the flame surface, the introduction of the fuel, waste gases, and oxidizer is cut off. In the state wherein the introduction of the fuel, waste gases, and oxidizer is cut off, the waste gas treatment method further includes the steps of: increasing the distance between the first porous body and the second porous body; additionally forming the flame surface by means of the igniter located between the first porous body and the second porous body; measuring a temperature of the flame surface; and if the temperature of the flame surface is more than the given temperature, decreasing the distance between the first porous body and the second porous body.

Advantageous Effects

According to the present invention, the combustion device for burning refractory hazardous gases is configured to achieve high treatment efficiencies and high energy efficiencies and to allow waste gases to sufficiently reach a high temperature at which the waste gases are decomposed.

Further, the combustion device for burning refractory hazardous gases according to the present invention can perform combustion in the interiors of porous bodies, without having any additional device like a heat exchanger, so that heat recirculation can occur through the heat transfer of the conduction and radiation of the porous bodies, and further, the excess enthalpy combustion can be easily conducted at a high temperature.

Furthermore, the combustion device for burning refractory hazardous gases according to the present invention can mix the waste gases excessively diluted with inert gas with fuel and oxidizer, supply the mixed waste gases to the interiors of porous bodies, and burn the waste gases, so that the waste gases can be burned by very high temperature flames, which are not obtained in the typical combustion technologies, through the heat recirculation of the porous bodies, thus improving the treatment efficiencies of the waste gases, and also, the combustion device can treat the waste gases only with a relatively small quantity of fuel, thus improving the energy efficiencies.

Additionally, the combustion device for burning refractory hazardous gases according to the present invention can move any one of porous bides so as to effectively form flames in an initial step and to ensure a space for forming a flame surface, thus solving the problems that a long period of time is needed to stabilize the temperatures of flames and energy efficiencies are decreased when the flame surface is formed in the interiors of the porous bodies, and further, the combustion device of the present invention can ensure sufficient air for forming the flame surface, thus effectively forming the flame surface within a short period of time.

Moreover, the combustion device of the present invention can move any one of porous bides so as to constantly maintain the temperature of a flame surface if the temperature of the flame surface is decreased to reduce the efficiency of the combustion device, while driven, thus increasing the space of the flame surface to ensure sufficient air for forming the flame surface, and further, the combustion device of the present invention can constantly maintain the temperature of the flame surface to increase the efficiency of the combustion device.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Figure 1:
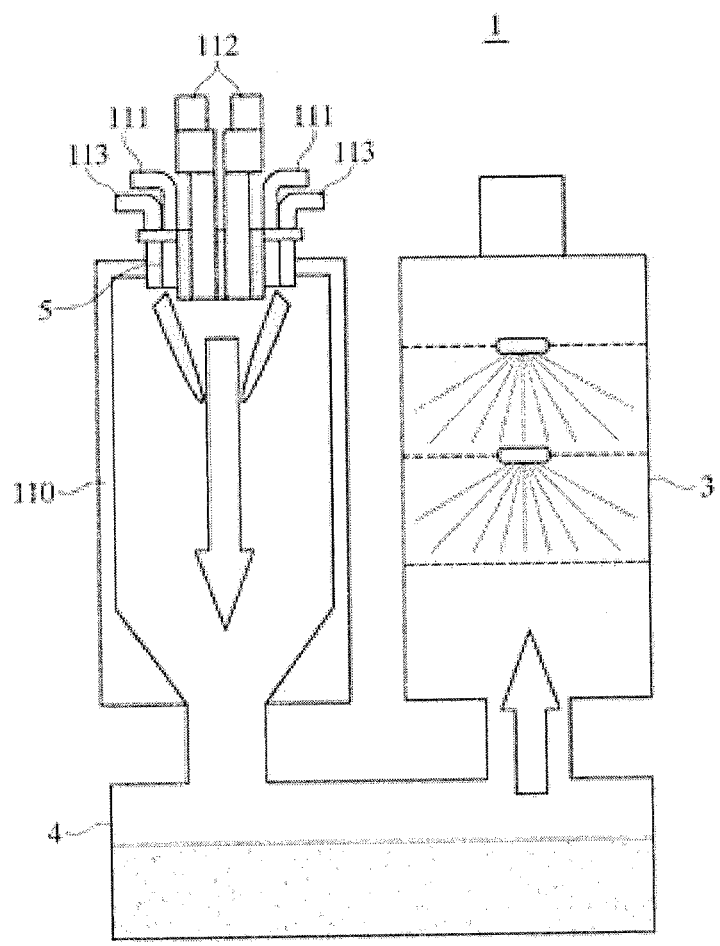
FIG. 1 is a front view showing a conventional waste gas treatment scrubber system.
Figure 2:
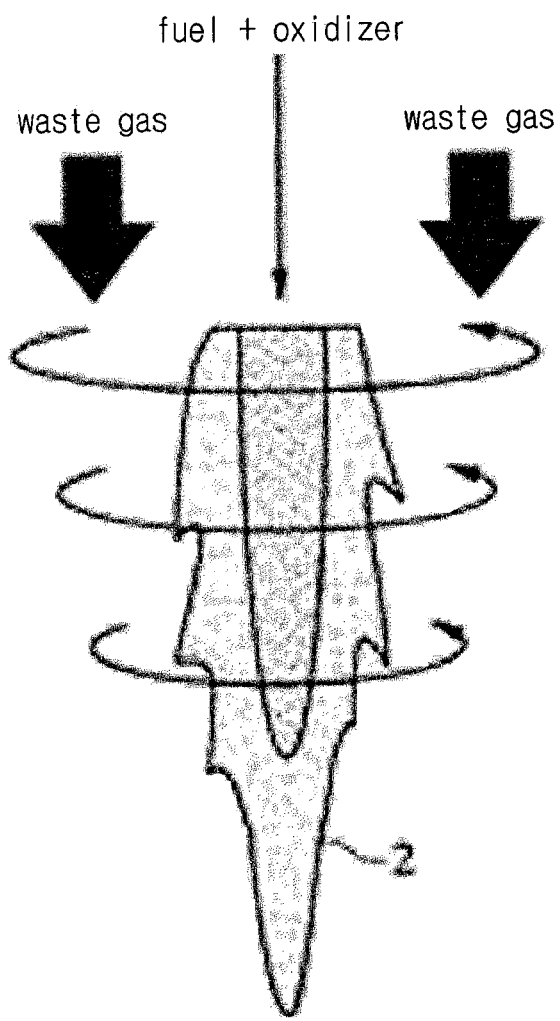
FIG. 2 is a schematic view showing waste gases and flames generating swirl flows in the conventional practice.
Figure 3:
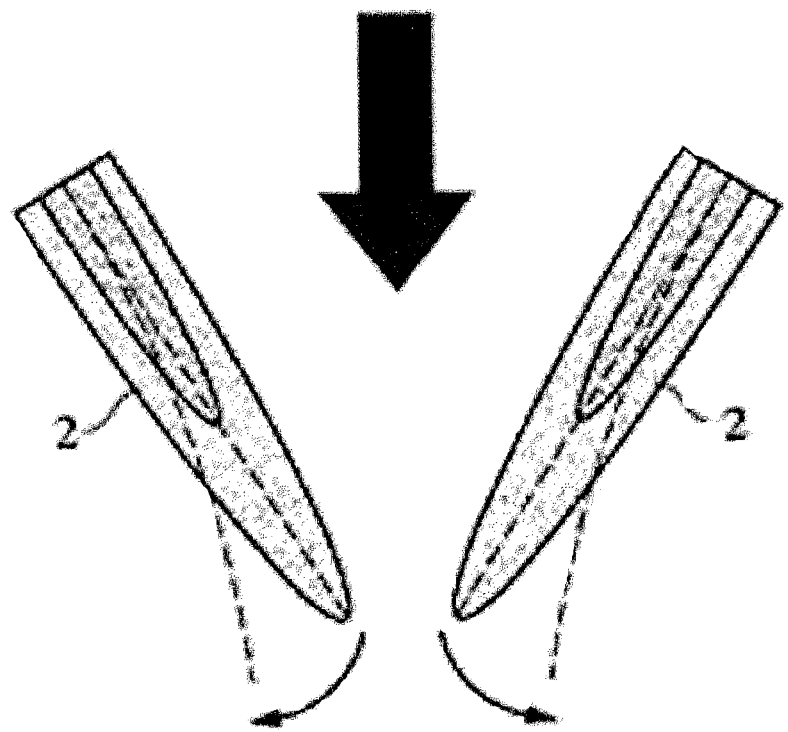
FIG. 3 is a schematic view showing flames injected in a cross-flow way with respect to the flows of waste gases in the conventional practice.
Figure 4:
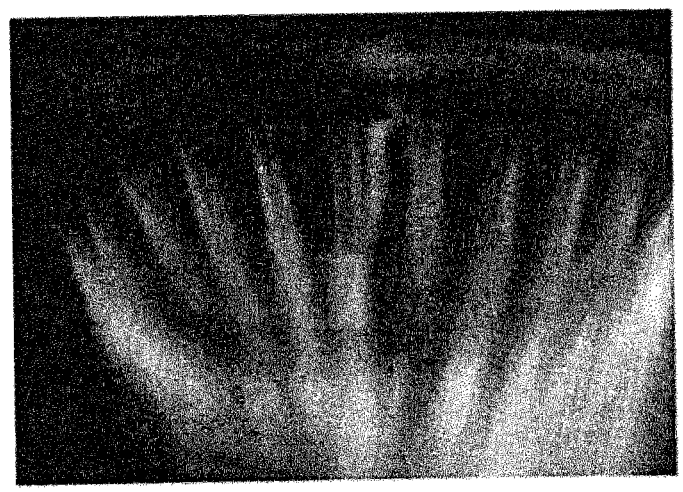
FIG. 4 is a photograph showing the flames of FIG. 3.

| <Explanations on reference numerals in the drawing> | |
|---|---|
| 1: | scrubber system |
| 2: | flames |
| 3: | wet tower |
| 4: | water storage tank |
| 5: | burner |
| 110: | combustion device |
| 111: | fuel inlet |
| 112: | waste gas inlet |
| 113: | oxidizer inlet |
| 141: | first porous body |
| 142: | second porous body |
| 150: | outlet |

BEST MODE FOR INVENTION

Hereinafter, the technological configurations of a combustion device for burning refractory hazardous gases according to the present invention will be in detail described with reference to drawings. If it is determined that the detailed explanation on the well known technology related to the present invention makes the scope of the present invention not clear, the explanation will be avoided for the brevity of the description.

In the description, also, the corresponding parts in the embodiments of the present invention are indicated by corresponding reference numerals and the repeated explanation on the corresponding parts will be avoided. Further, the term 'coupled' or 'connected', as used herein, is defined as connected, although not necessarily directly, and not necessarily mechanically. To the contrarily, the term 'directly coupled' or 'directly connected', as used herein, is defined as connected without having any component disposed therebetween.

Figure 5:
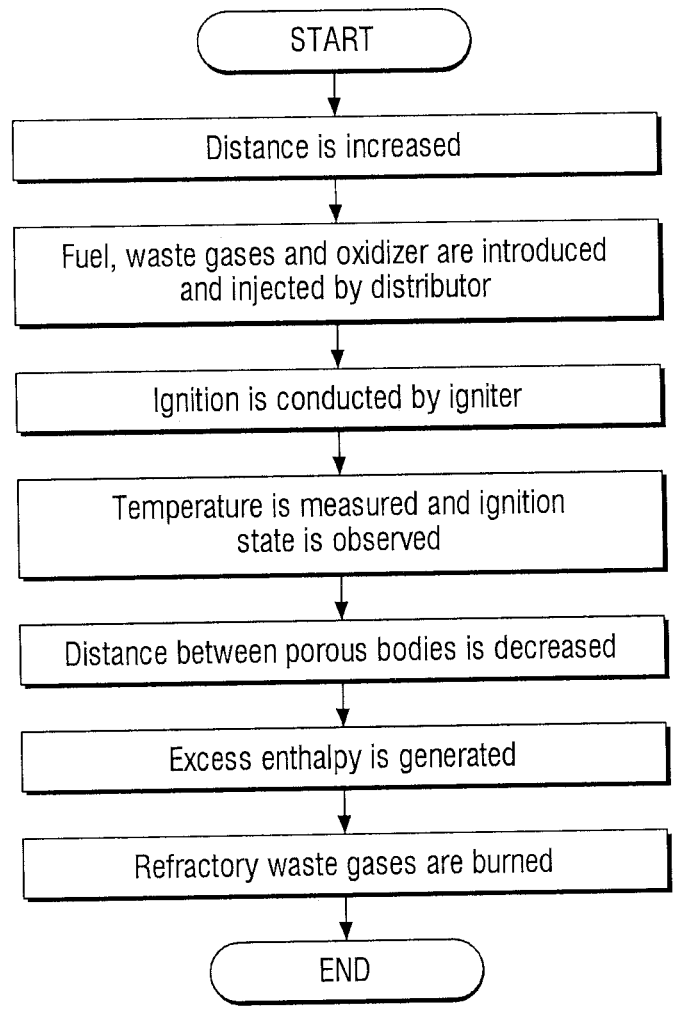
FIG. 5 is a flowchart showing a waste gas treatment method using a combustion device for burning refractory hazardous gases according to the present invention.

Hereinafter, an explanation on the configuration of a combustion device for burning refractory hazardous gases according to the present invention and a waste gas treatment method using the combustion device according to the present invention will be given. FIG. 5 is a flowchart showing a waste gas treatment method using a combustion device for burning refractory hazardous gases according to the present invention, and FIG. 6 is a sectional view showing an operating method for the combustion device for burning refractory hazardous gases according to the present invention.

Figure 6:
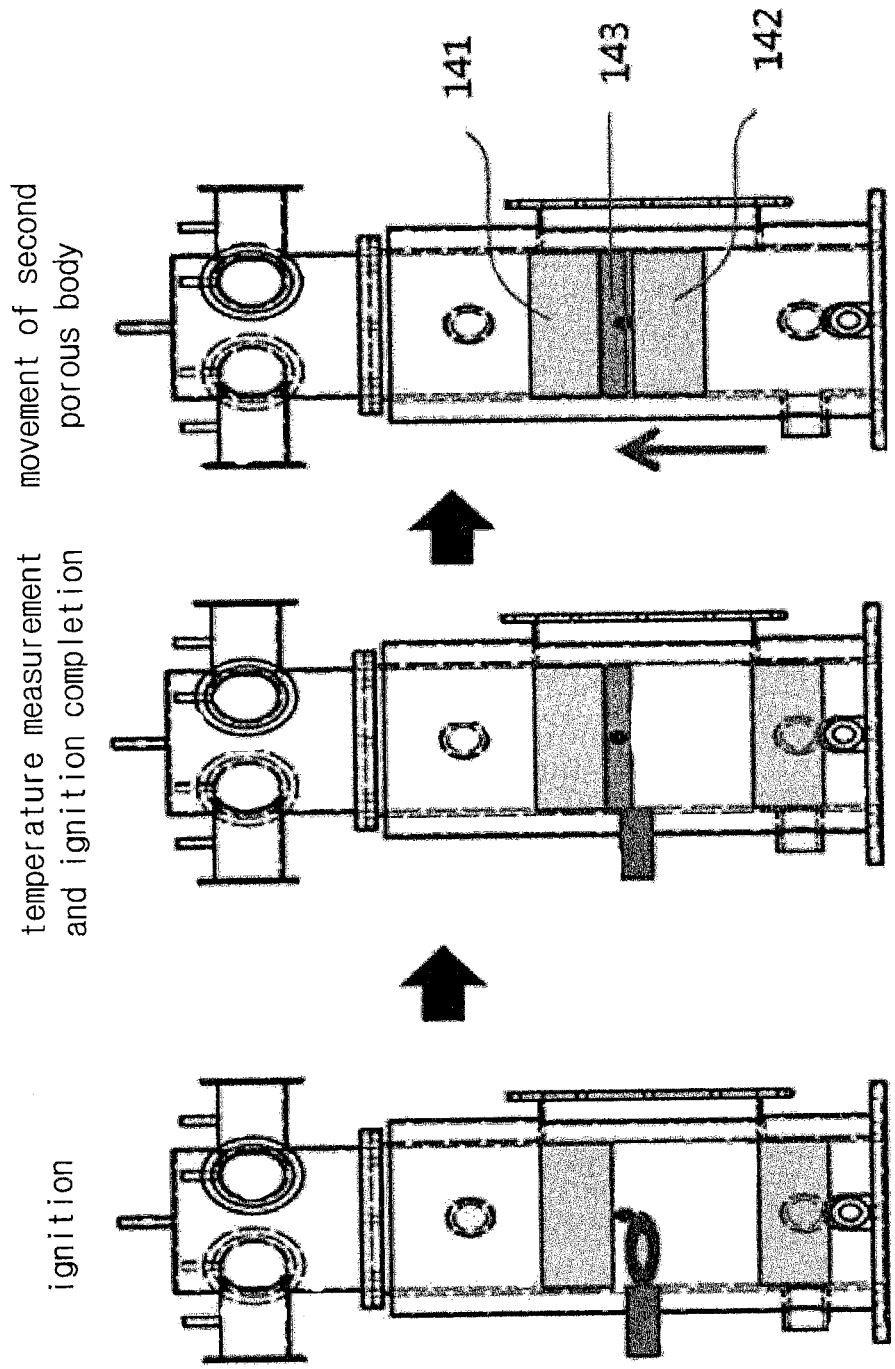
FIG. 6 is a sectional view showing an operating method for the combustion device for burning refractory hazardous gases according to the present invention.

As shown in FIG. 6, a combustion device 110 for burning refractory hazardous gases according to the present invention includes fuel inlets 111, waste gas inlets 112, oxidizer inlets 113 formed on one end thereof, an outlet 150 formed on the other end thereof to discharge exhaust gases generated after the waste gases is burned therefrom, and a first porous body 141, a second porous body 142 and a flame surface 143 formed on the intermediate portion thereof.

According to the present invention, the combustion device 110 for burning refractory hazardous gases is characterized in that the flame surface 143 is formed between the first porous body 141 and the second porous body 142 before fuel, waste gases and oxidizers are injected thereinto. So as to effectively form flames, the second porous body 142 moves to increase the distance between the first porous body 141 and the second porous body 142. As the distance between the first porous body 141 and the second porous body 142 becomes increased, accordingly, the space in which the flame surface 143 is formed is extended so that a sufficient quantity of air for forming the flame surface 143 is supplied to the space, thus efficiently forming the flame surface 143 for a short period of time. At this time, a temperature of the flame surface 143 is measured, and if the measured temperature is more than a given temperature, the second porous body 142 moves to the first porous body 141 to decrease the distance between the first porous body 141 and the second porous body 142. Next, the burning process is conducted.

If the flame surface 143 is formed between the first porous body 141 and the second porous body 142, further, the combustion device 110 for burning refractory hazardous gases according to the present invention includes a premixture for mixing the fuel introduced through the fuel inlets 111, the waste gases introduced through the waste gas inlets 112, and the oxidizer introduced through the oxidizer inlets 113, thus allowing the gas mixed by the premixture to be introduced thereinto.

MODE FOR INVENTION

Hereinafter, the combustion device 110 for burning refractory hazardous gases according to the present invention includes the premixture and a distributor located between the premixture and the porous bodies to equally introduce the gas mixed in the premixture into the porous bodies.

Further, the combustion device 110 includes ceramic porous bodies having given pore sizes, and the ceramic porous bodies are brought into contact with the inner wall of the intermediate portion of the combustion device 110 so that the premixed gas introduced from the distributor passes through the ceramic porous bodies. Further, flames are formed on the center in the thickness direction of the ceramic porous bodies.

The ceramic porous bodies constituting the combustion device 110 desirably include at least any one selected from a ceramic honeycomb, a ceramic foam, and a ceramic ball bed.

The combustion device 110 for burning refractory hazardous gases according to the present invention further includes an insulation layer for insulating the outer wall of a body thereof.

Further, as mentioned above, the waste gases introduced through the waste gas inlets include the refractory hazardous gases discharged in the semiconductor or display manufacturing process and inert gases for diluting the hazardous gases.

According to a waste gas treatment method using the combustion device 110 for burning refractory hazardous gases according to the present invention, first, the fuel, waste gases and oxidizer are introduced into the premixture disposed inside the combustion device 110 through the fuel inlets 111, the waste gas inlets 112, and the oxidizer inlets 113 formed on one end thereof. Desirably, oxygen for high temperature reaction is used as the oxidizer introduced through the oxidizer inlets 113, and in some cases, if quantities of inert gases for diluting the refractory hazardous gases are relatively small, that is, if the density of refractory hazardous gases is high, air is used as the oxidizer, thus saving the cost of oxygen consumed. According to the present invention, further, LNG or LPG can be used as the fuel introduced through the fuel inlets 111.

The premixture serves to mix the waste gases, fuel and oxidizer introduced thereinto with each other. Further, the premixture may be formed integrally with the ceramic porous bodies or coupled independently therewith.

Through the distributor disposed between the premixture and the ceramic porous bodies, further, the gas mixed in the premixture is introduced equally into the ceramic porous bodies. That is, the premixed gas passes through the ceramic porous bodies disposed inside the combustion device 110, thus allowing the waste gases to be burned by means of the flames formed in the ceramic porous bodies.

The ceramic porous bodies are important components of the combustion device 110 according to the present invention, and as mentioned above, the distance between the first porous body 141 and the second porous body 142 is increased at an ignition step in which the flame surface 143 is formed, so that the flame surface 143 is formed. If a temperature of the flame surface 143 is more than a given temperature, the distance between the first porous body 141 and the second porous body 142 is decreased, so that the burning process is conducted.

The premixed gas passes through the first porous body 141, the flame surface 143, and the second porous body 142, thus achieving energy collection using excess enthalpy combustion within the ceramic porous bodies.

Figure 7:
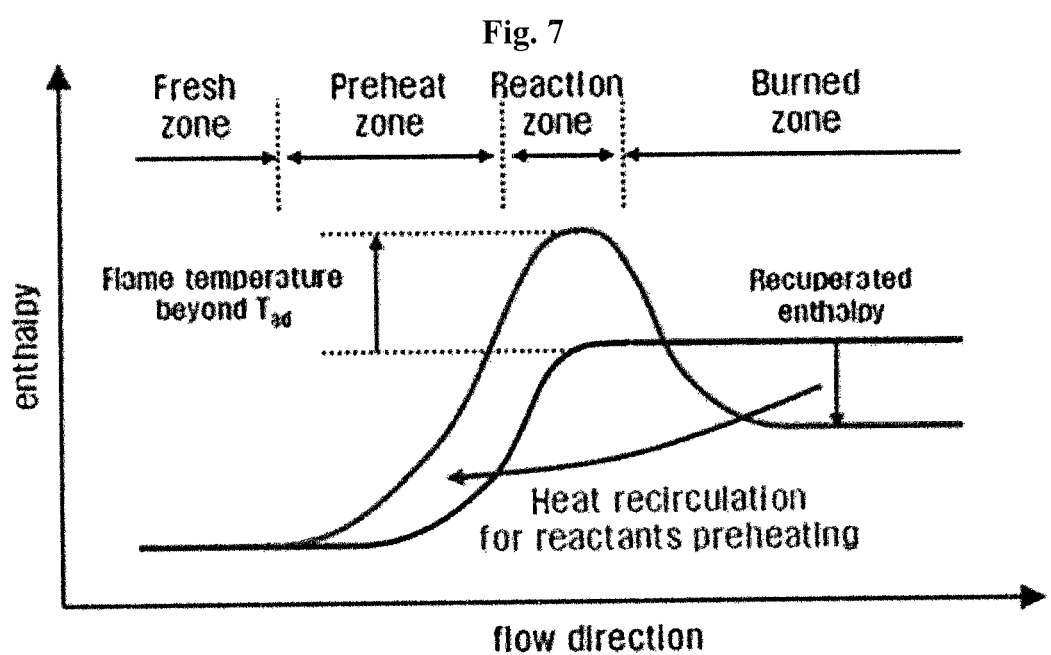
FIG. 7 is a graph showing theoretical temperatures (enthalpy) of the waste gases flowing in the conventional combustion device and theoretical temperatures (enthalpy) of the waste gases flowing in the combustion device for burning refractory hazardous gases according to the present invention.

FIG. 7 is a graph showing theoretical temperatures (enthalpy) of the waste gases flowing in the conventional combustion device and theoretical temperatures (enthalpy) of the waste gases flowing in the combustion device for burning refractory hazardous gases according to the present invention. If no loss of heat to the outside exists, the fuel and oxidizer under given conditions are burned to reach a maximum temperature, and at this time, the maximum temperature is called an adiabatic flame temperature. In this case, if heat recirculation from high temperature combustion gas to cool unburned gas is conducted, a temperature higher than the adiabatic flame temperature can be obtained. This is called excess enthalpy combustion. As shown in FIG. 7, if the combustion is conducted in the ceramic porous bodies, without having any additional device like heat exchanger, the heat recirculation can occur through the heat transfer of the conduction and radiation of the ceramic porous bodies, and further, the excess enthalpy combustion can be easily accomplished.

In the burning process of the refractory hazardous gases, accordingly, if the waste gases excessively diluted with the inert gases are mixed with the fuel and oxidizers and supplied and burned to the interior of the porous bodies, the mixed gas can be burned by the flames having very high temperatures, which are not obtained in the typical combustion technologies, through the heat recirculation of the porous body combustor, thus improving the treatment efficiencies of the waste gases. Furthermore, the waste gases can be treated only with a relatively small quantity of fuel, thus improving the energy efficiencies. For example, that is, about 50 LPM of LNG is generally consumed in treating about 200 LPM of refractory hazardous gases, but according to the present invention, the combustion device having the ceramic porous bodies can consume about 20 LPM of LNG in treating the same quantity of refractory hazardous gases.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A waste gas treatment method using a combustion device provided in a scrubber system for burning waste gases, the method comprising the steps of:
   increasing the distance between a first porous body and a second porous body located at the intermediate portion of the combustion device so as to drive the combustion device;
   forming a flame surface by means of an igniter located between the first porous body and the second porous body;
   measuring a temperature of the flame surface; and
   if the temperature of the flame surface is more than a given temperature, decreasing the distance between the first porous body and the second porous body, thus producing excess enthalpy flames;
   further comprising the step of introducing fuel, waste gases, oxidizer through fuel inlets, waste gas inlets, and oxidizer inlets formed on one end of the combustion device into the combustion device;
   wherein the introduced fuel, waste gases, and oxidizer are brought into sequential contact with the first porous body, the flame surface, and the second porous body;
   wherein if the temperature of the flame surface is decreased during introduction of the fuel, waste gases, and oxidizer passing through the flame surface, the introduction of the fuel, waste gases, and oxidizer is cut off.

2. The waste gas treatment method according to claim 1, further comprising the steps of:
   in the state wherein the introduction of the fuel, waste gases, and oxidizer is cut off, increasing the distance between the first porous body and the second porous body;
   additionally forming the flame surface by means of the igniter located between the first porous body and the second porous body;
   measuring a temperature of the flame surface; and
   if the temperature of the flame surface is more than the given temperature, decreasing the distance between the first porous body and the second porous body.

* * * * *